UNITED STATES PATENT OFFICE.

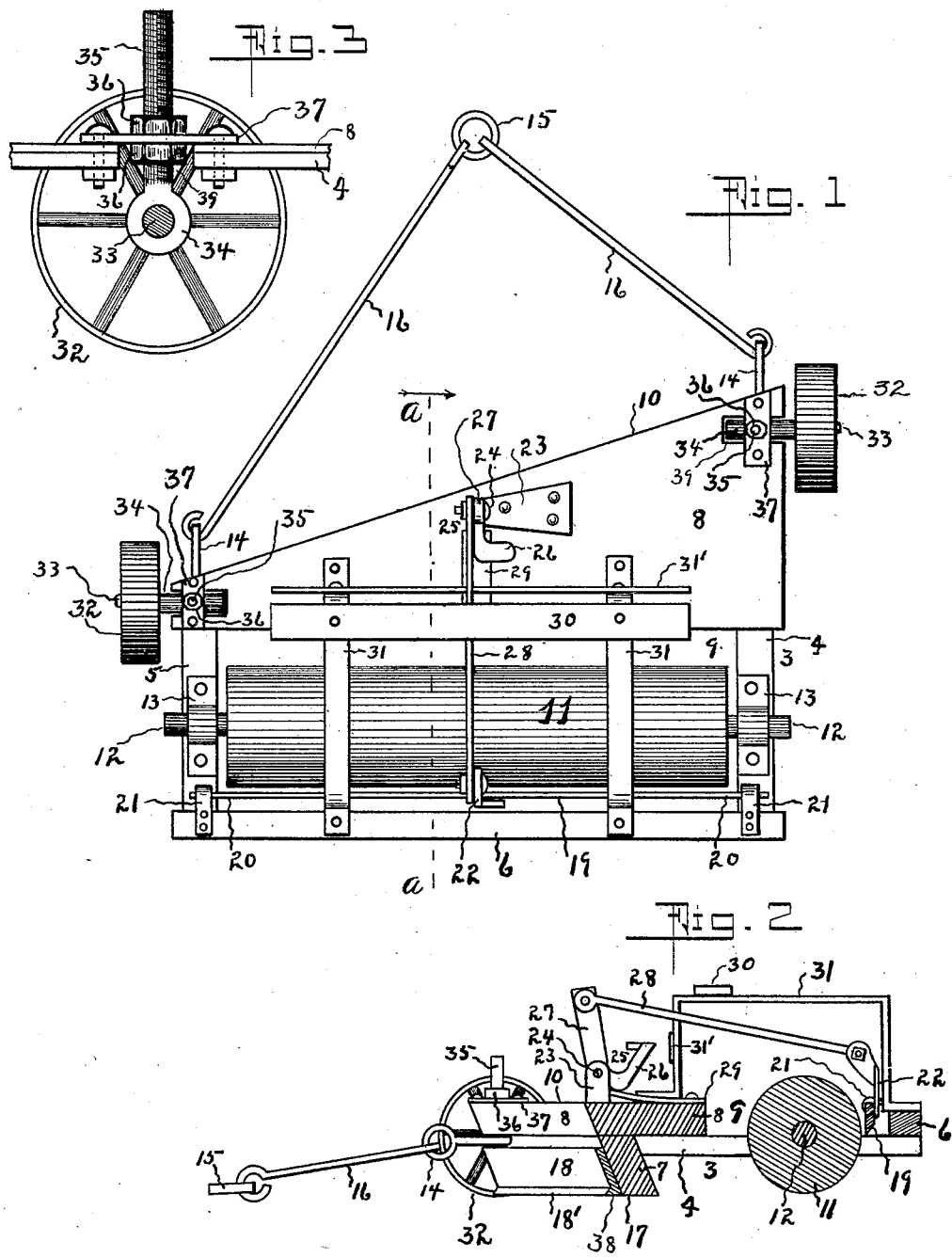

WILLIAM H. McCONNELL, OF HARLAN, IOWA.

COMBINATION ROLLER AND SCRAPER.

946,978.　　　　　　Specification of Letters Patent.　　Patented Jan. 18, 1910.

Application filed May 5, 1909. Serial No. 494,090.

*To all whom it may concern:*

Be it known that I, WILLIAM H. McCONNELL, a citizen of the United States, residing at Harlan, in the county of Shelby and State of Iowa, have invented certain new and useful Improvements in Combination Rollers and Scrapers, of which the following is a specification.

This invention relates to improvements in a combination roller and scraper of the class adapted for use in road-working and as an agricultural implement.

The object of the invention is to provide a machine which will be effective, when moved forwardly, for scraping or leveling the soil of a road bed and will roll the soil after it is thus evened or leveled, and which by reason of certain devices employed, may be conveniently adjusted to operate as a roller for field use to smooth lumpy ground, or the like.

The novel features of the invention are fully described herein, pointed out by the appended claim and illustrated in the accompanying drawing, it being understood that changes in form, size or proportion may be made, within the scope of the claims, without departing from the spirit of the invention or sacrificing any of its advantages.

In the drawing Figure 1 is a plan view of a combined roller and scraper embodying my invention. Fig. 2 is a view of the same in longitudinal section, on line *a a* of Fig. 1. Fig. 3 is a detail relating to the mounting of the wheels.

Referring now to the drawing for a more particular description numeral 3 indicates a frame comprising parallel, supporting end-plates 4 and 5, a rear cross-plate 6 secured at its ends to the rear ends of plates 4 and 5 and disposed, substantially, at right angles thereto, a scraper-bar 7 being secured upon the front ends of end-plates 4 and 5. The frame thus provided is rectangular in form, except the front end which extends diagonally from one end-plate to the other, end-plate 4 being longer than end-plate 5; and scraper-bar 7, while extending transversely, is disposed diagonally from the longer to the shorter end of the frame.

I provide platform 8 having parallel ends, its rear edge being parallel with cross-plate 6 and terminating short thereof, to provide a rectangular opening or recess 9 near the rear part of the machine, its front edge or side 10 being seated upon the scraper-bar.

Within recess 9 is disposed the cylindrical roller 11, its shaft 12 being seated in suitable boxing 13 upon end plates 4 and 5. At 14 are shown clevises or screw-eyes, these being secured near the ends of bar 7, to project at the front of the machine. A pull-ring is shown at 15 at the front and midway between the ends of the machine; and connecting-rods may extend between this ring and the screw-eyes.

Scraper-bar 7 is inclined upwardly and forwardly from its lower, flattened side or edge 17 to the platform, this particular part of the scraper-bar being formed with a broad contact-surface disposed parallel with the platform, its wide surface being useful to prevent an undue engagement of the soil. Said scraper-bar may have the longitudinal shoe or contact-bar 18 secured thereon, said bar having a tapered or sharpened longitudinal ridge 18' formed to extend forwardly thereon, said ridge having a lower surface 38 disposed in the same plane with edge 17 of bar 7.

As thus described the machine or implement may be used to advantage as a scraper and roller for work upon road beds, and when moved forwardly the scraper-bar and contact-bar will engage the surface of the soil; on account of the upward and forward inclination of the scraper-bar, as described and on account of the flattened surfaces mentioned of bars 7 and 18, only a limited quantity of soil will be engaged; and on account of the angular disposition of the scraper, the machine will operate to convey accumulations toward its shorter end; and when in use as a road implement, the shorter end of the machine is disposed at or near the middle of the roadway, so that accumulations will be moved in that direction.

I provide the longitudinal scraper or blade 19, having its ends 20 mounted pivotally in brackets or bearings 21, secured upon cross-plates 6, and as a control for causing the blade to engage the periphery of the roller, for the purpose of removal of adhering soil, I employ arm 22, said arm being secured at its lower end upon and midway of the ends of the blade. I provide the bracket 23, mounted upon the platform. At 24 upon the bracket is mounted the rock-lever 25, comprising arm or treadle 26 and arm 27. I employ link 28 connecting pivotally between the upper end of arm 22 and arm 27 of the rock-lever.

Arm 26 of the rock-lever is engaged by spring 29, this spring being secured to the platform; the engagement of the spring with said arm causes blade 19 to remain normally out of contact with the surface of the roller. When it is desired to move adhering soil from the roller, a downward movement of the treadle may be made to cause an engagement of the blade with the surface of the roller. At 30 is shown a driver's seat suitably supported upon bars 31, the latter being secured to the frame to overhang the roller, and at 31' is shown a guard-rail.

I provide wheels 32 having axles 33 mounted at the opposite ends and near the front of the machine, and thereby the scraper-bar may be raised so that, during the forward movement of the machine, said scraper-bar will not engage the soil, whereby the implement may be used as a roller to level or harden the ground in a field this being useful in some instances where crops have been planted, and by providing means for vertical adjustment of the axles, the scraper-bar may be under control so that it may be disposed closely adjacent to the soil, this feature being useful for many purposes.

The wheels at all times limit the downward movement of the scraper and prevent said scraper from entering the soil beyond a predetermined degree. In some cases however, the roadway may be so hard as to support the scraper in such a position that the wheels will not come into action.

The wheels may be mounted in openings 39, formed in the ends of platform 8. As a means for vertical adjustment of the wheels, a housing or casing 34 may be provided for the axles, having a transverse, threaded wrist-pin 35; threaded washers or nuts 36 may be employed for these pins, one being seated below and the other above plate 37, said plate being secured upon the platform, whereby the platform may be disposed at a desired altitude above the axles, and the scraper-bar will be under control to be elevated or lowered.

Having fully described my invention, what I claim as new and desire to secure by Letters Patent, is,—

A combined roller and scraper comprising a supporting frame, a road roller supporting the rear of said frame, a scraper bar diagonally arranged across the front of said supporting frame, and means for adjustably supporting the front of said frame and said scraper bar, said means comprising ground wheels and axles therefor, housings in which said axles are mounted, threaded vertical stems projecting from said housings through a portion of said frame, and members threaded upon said stems for locking them in their adjusted positions.

In testimony whereof I have affixed my signature in presence of two witnesses.

WILLIAM H. McCONNELL.

Witnesses:
   HIRAM A. STURGES,
   ARTHUR H. STURGES.